March 29, 1949.                N. MARCHAND                2,465,384
                            SECTOR ADCOCK SYSTEM
Filed Nov. 21, 1945                                   2 Sheets-Sheet 1

INVENTOR.
NATHAN MARCHAND
BY
ATTORNEY

March 29, 1949.   N. MARCHAND   2,465,384
SECTOR ADCOCK SYSTEM
Filed Nov. 21, 1945   2 Sheets-Sheet 2
Fig.2.
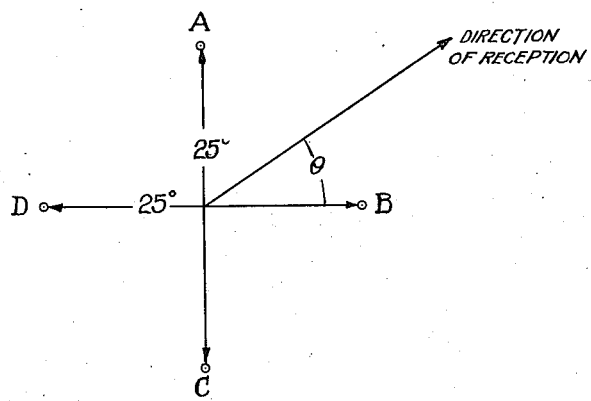
Fig.3.
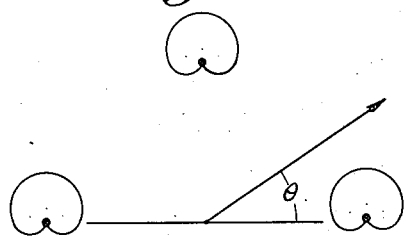
Fig.4.
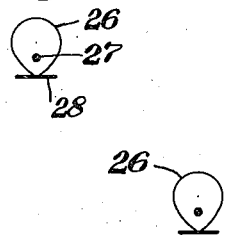
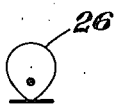
Fig.5.
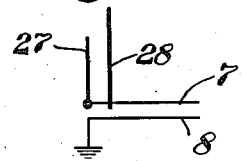
INVENTOR.
NATHAN MARCHAND
BY
R P Morris
ATTORNEY Patented Mar. 29, 1949

2,465,384

UNITED STATES PATENT OFFICE 2,465,384

SECTOR ADCOCK SYSTEM

Nathan Marchand, New York, N. Y., assignor to Federal Telephone and Radio Corporation, New York, N. Y., a corporation of Delaware Application November 21, 1945, Serial No. 630,068

8 Claims. (Cl. 343—120)

This invention relates to modified Adcock antenna systems particularly for direction finding systems.

While the advantages of Adcock antenna arrays for direction finding purposes have long been recognized, the use of such arrays in areas where adjacent structure interferes with the omni-directional characteristics of any unit of such array will introduce errors. Thus on shipboard such arrays have had to be located high up on a mast with long leads to the receiver or have required the location of the receiver on an elevated platform.

It has heretofore been proposed, as for example, in the copending application of H. G. Busignies, for "Direction finders," Serial No. 553,598, filed September 11, 1944, to use a plurality of antenna arrays which for example, on shipboard, are located on opposite sides of the ship or fore and aft, each array being used to only scan a sector of the horizon clear of superstructure so as to minimize interference effects from the superstructure. The antenna arrays proposed for this use each have usually included two spaced units, commonly dipoles, arranged at one point of the ship with shielding means arranged behind each of the dipoles to provide them with a unidirectional pattern, the dipoles being cross-connected with each other and to a direction-finding receiver. Phase-shifting means have been used to provide for sector scanning in these arrays.

An object of the present invention is the provision of an improved Adcock antenna array.

Another object is the provision of an improved direction finder employing an Adcock type collector system.

Another object is the provision of an improved sector type direction finder using Adcock type antenna arrays.

Other and further objects of the present invention will become apparent and the invention will be best understood from the following description of an embodiment thereof, reference being had to the drawings, in which:

Fig. 2 is a diagram used in analyzing the operation of the system of Fig. 1;

Fig. 3 is a set of cardioids indicating the reception pattern obtained from one sector Adcock antenna array;

Figure 1:
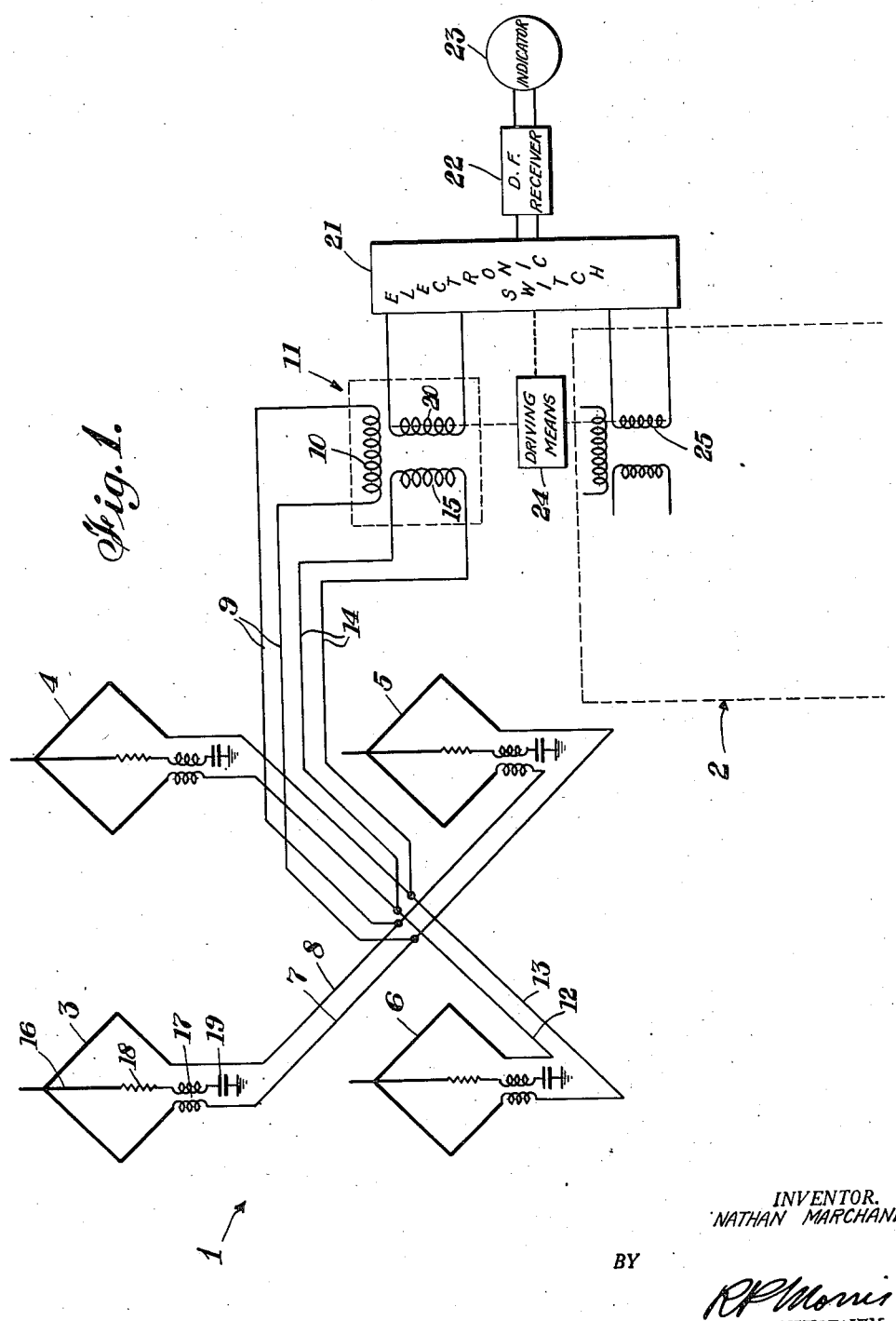
Fig. 1 is a schematic diagram of a sector type Adcock direction finding system embodying my invention.

Fig. 4 indicates another type of antenna that may be used in the place of the antenna units of Fig. 1 in the Adcock array thereof; and Fig. 5 is a schematic side view of one antenna unit of Fig. 4, showing its relation to its associated shield.

Referring now to Fig. 1, the system there illustrated includes two collector units generally designated by the numerals 1 and 2 respectively. Since these two collector units are similar in construction, only unit 1 will be described in detail. Unit 1 may be located at one end of a draft as for example, at the forward end of a ship with unit 2 located at the rear end of the ship or these units may be similarly arranged around other structures.

Collector unit 1 includes four loop antennas 3, 4, 5 and 6, oriented in a given direction with 3 and 5 forming one pair of opposite loops, and 4 and 6 forming the other pair of opposite loops, the two pairs of loops being crossed so that each of the loops is equi-distant from a center point. Loops 3 and 5 are cross-connected in phase opposition by lines 7 and 8 respectively and are connected by a dual transmission line 9 to one of the fixed coils 10 of a goniometer 11. Likewise loops 4 and 6 are cross-connected by lines 12 and 13 which lines are in turn connected over a dual transmision line 14 to the other fixed coil 15 of goniometer 11.

Loops 3—6 would each, in the absence of anything further, produce a figure-of-eight reception pattern. However it is preferred in this system to obtain a unidirectional pattern in the form of a cardioid from each of the loops and this is accomplished by associating with each of the loops, a sensing antenna arrangement. For example, loop 3 is provided with an omni-directional antenna 16, which is connected through the secondary of a coupler 17 to ground, a resistor 18 and condenser 19 being preferably arranged in series therewith to provide for the proper phase shift. In one leg of loop 3 or in the line 7 connected thereto, the primary of the coupler 17 is arranged in series and in coupling relationship with the secondary. A similar sensing arrangement is provided in association with each of the other loops 4, 5 and 6. The resultant pattern produced by each of the loops is a cardioid, as indicated in Fig. 3, and these cardioids are oriented in the same direction.

The rotating coil 20 of goniometer 11 is connected to an electronic switch 21 and through said switch 21 to the direction finding receiver 22 which has, as its output, a suitable indicator such as a cathode ray oscillograph tube 23. The rotatable coil 20 is driven by a driving means 24, which is also used to control the rotation of the rotatable coil 25 in the collector system 2, which is exactly similar to the collector system 1 and also includes a goniometer as does the system 1. However, the cardiods of collector system 2 are oriented in a direction opposite to those of collector system 1 so that each cover a different sector. The driving means 24 also synchronizes the operation of the electronic switch 21 so that as each sector covered by systems 1 or 2 has been scanned, the electronic switch switches out that collector unit and switches in the other collector unit to control the direction finding receiver and indicator.

Ordinarily, the radiation pattern of each antenna unit in an Adcock array is substantially circular. Suppose now that the radiation pattern of each antenna was not circular, but of some peculiar shape dependent on the angle of reception $\theta$ namely $f(\theta)$ (see Fig. 2). This means that from a single antenna the voltage received at a distance $k$ from the antenna and at an angle $\theta$ to the normal would be E where $$E = Kf(\theta) \quad (1)$$

K being a constant dependent on distance from the antenna and amount of power.

Now let four antennas of this type be placed at the corners of a square whose diagonals measure 2 S°. The four antennas are aligned so that their patterns are placed similarly with respect to the co-ordinates.

Antennas A and C are cross-connected and antennas B and D are cross-connected. The voltage output from antennas B and D is designated as $E_{24}$. This is $$E_{24} = K'f(\theta) \sin(S° \sin \theta) \quad (2)$$

and K' is a new constant dependent on the cross-over connection. The voltage from antennas A and C is designated as $E_{13}$ where $$E_{13} = K'f(\theta) \sin(S° \cos \theta) \quad (3)$$

If the connection between A and C is similar to that between B and D, the new constant will be the same namely K'. It can be seen that $f(\theta)$ is a factor in both $E_{24}$ and $E_{13}$. A goniometer if used in any of the normal Adcock systems will give an indication dependent on the ratio of $E_{24}$ to $E_{13}$. If the ratio is a tangent or a co-tangent function of $\theta$, the indication of the goniometer will be the direct indication of the direction of reception. Taking the ratio of $E_{24}$ to $E_{13}$ $$\frac{E_{24}}{E_{13}} = \frac{\sin(S° \sin \theta)}{\sin(S° \cos \theta)} \quad (4)$$

where the K' and $f(\theta)$ cancel out. From Equation 4, if S° is small with respect to a wavelength, the sine functions can also be removed so that the final equation is $$\frac{E_{24}}{E_{13}} = \tan \theta \quad (5)$$

which is the correct equation for an Adcock system.

This means that as each of the antennas A, B, C, and D have a specific pattern like a cardioid as shown in Figure 3 and they are so aligned, that the nulls all point in the same direction, it will operate correctly as an Adcock system except that it will not receive any indication from the direction in which the null of the cardioid is pointed. Thus it will not be affected by structures located on the side of the array toward the null direction. It can be seen from Figure 3 that as the signal came from the angle $\theta$, it will intersect each of the cardioids in the same point so that the actual voltage received in all the antennas will be exactly similar. Since the voltage and its phase shift introduced by each of the antennas are similar, the resultant voltage at the center of the cross-connecting line will then indicate the correct direction on a goniometer. Sense may be obtained in the normal manner by use of a fifth antenna or a combination of the inputs of the four antennas.

While in the foregoing description reference has been made to the use of cardioid patterns for each unit of an Adcock array, it is also feasible to use other forms of reception patterns therefor. For example, a highly satisfactory form of reception pattern may also be a different form of unidirectional pattern, for example in the form of a lobe, as illustrated in Fig. 4, in which each of the patterns are designated by the numeral 26. The individual antenna unit which may be employed for producing this pattern may consist, for example, of a monopole 27 arranged in front of a shield 28 with four of such units replacing the loops 3—6 of Fig. 1 and their associated sensing arrangements. Fig. 5 shows a side view of such a unit with the monopole 27 arranged in front of the shield 28. It will be apparent that numerous other types of units may be employed to produce this unidirectional pattern such as by arranging dipoles in front of shields, etc. It is to be seen that all the unidirectional patterns are oriented in the same general direction and are similar in outline. The connections between the various antenna units illustrated in Fig. 4 and Fig. 5 are made in the cross-connected manner illustrated in Fig. 1.

While I have described my invention in connection with certain specific reception patterns produced by specific antenna units, it will be apparent that these patterns may be produced by various other types of units or antenna assemblies arranged in an Adcock type array. Similarly, it will be apparent that any patterns other than omni-directional patterns, may be used in accordance with my invention. Preferably unidirectional patterns are used to obtain the advantage of null pick up in particular directions. Furthermore while I have described the use of my invention in connection with one specific type of direction finder using four units, it will be apparent that it may be employed with various other types using more units if desired.

Accordingly, while I have described above the principles of my invention in connection with specific apparatus, and particular modifications thereof, it is to be clearly understood that this description is made only by way of example and not as a limitation on the scope of my invention as defined in the accompanying claims.

I claim:

1. A collector system comprising four fixed unidirectional antenna units symmetrically disposed around a central point and having their reception patterns oriented in the same direction, said units being arranged in oppositely spaced crossed pairs, transmission lines cross-connecting the units of each pair in phase opposition, a goniometer having two stators, and means coupling the transmission lines associated with each pair to separate ones of the stators.

2. A collector system according to claim 1 wherein each of said four antenna units comprises radiant-acting elements producing a cardioid pattern.

3. A collector system according to claim 1 wherein each of said antenna units comprises radiant-acting elements producing a figure-of-eight reception pattern, radiant-acting elements producing an omni-directional reception pattern, and means for combining the output of said radiant-acting elements to produce a resulting cardioid reception pattern.

4. A collector system according to claim 1 wherein each of said antenna units comprises means for producing an omni-directional reception pattern, and reflecting means for converting said omni-directional reception pattern into a unidirectional pattern.

5. A collector system according to claim 1 wherein each of said antenna units comprises radiant-acting means for producing an omni-directional reception pattern, and a shield arranged behind said last-mentioned means for reflecting the energy therefrom to produce a unidirectional pattern.

6. A collector system according to claim 1 wherein each of said antenna units is comprised of a vertical monopole having a vertically-extending shield placed behind it to direct its pattern in the aforesaid direction.

7. A sector type direction finder comprising a collector system including four fixed unidirectional antenna units symmetrically disposed around a central point and having their reception patterns oriented in the same direction, said units being arranged in oppositely spaced crossed pairs, transmission lines cross-connecting the units of each pair, a goniometer having two stators and a rotor, and means coupling the transmission lines associated with each pair to separate ones of the stators; a direction finding receiver; an indicator at the output of said receiver; and means coupling said rotor to said direction finding receiver.

8. A sector type direction finder according to claim 7 further including another collector system similar to the one hereinabove described having its antenna unit reception patterns oriented in a direction different from the aforementioned direction to cover a sector other than that covered by the first-mentioned collector system, and said coupling means includes switching means for alternately coupling the collector systems to the receiver, said switching means being synchronized with the rotation of the goniometer.

NATHAN MARCHAND.

REFERENCES CITED

The following references are of record in the file of this patent:

UNITED STATES PATENTS

| Number | Name | Date |
| --- | --- | --- |
| Re. 16,834 | Knoll | Dec. 27, 1927 |
| 2,083,242 | Runge | June 8, 1937 |
| 2,083,416 | Aiken | June 8, 1937 |
| 2,190,717 | Kummich | Feb. 20, 1940 |
| 2,282,402 | Hefele | May 12, 1942 |
| 2,361,402 | Taylor | Oct. 31, 1944 |
| 2,392,420 | Steinhoff | Jan. 8, 1946 |
| 2,393,353 | Wirkler | Jan. 22, 1946 |
| 2,412,703 | Wolff | Dec. 17, 1946 |